United States Patent
Mizuno et al.

(10) Patent No.: US 8,475,866 B2
(45) Date of Patent: Jul. 2, 2013

(54) METHOD FOR MANUFACTURING CERAMIC ELECTRONIC COMPONENT

(75) Inventors: Tatsuya Mizuno, Kyoto-fu (JP);
Masaharu Konoue, Kyoto-fu (JP);
Hiroki Hashimoto, Kyoto-fu (JP);
Mitsuru Ueda, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 13/523,510

(22) Filed: Jun. 14, 2012

(65) Prior Publication Data

US 2012/0251709 A1   Oct. 4, 2012

Related U.S. Application Data

(60) Division of application No. 13/168,631, filed on Jun. 24, 2011, now Pat. No. 8,288,924, and a continuation of application No. PCT/JP2009/006493, filed on Dec. 1, 2009.

(30) Foreign Application Priority Data

Dec. 26, 2008  (JP) ................................. 2008-334072

(51) Int. Cl.
*H01G 7/00*  (2006.01)
(52) U.S. Cl.
USPC ................ 427/79; 427/80; 427/81; 29/25.41; 29/25.42
(58) Field of Classification Search
USPC ............................ 427/79–81; 29/25.41, 25.42
See application file for complete search history.

(56) References Cited

U.S. PATENT DOCUMENTS

| | | | | |
|---|---|---|---|---|
| 6,649,272 B2 * | 11/2003 | Moore et al. | ................... | 428/447 |
| 7,097,910 B2 * | 8/2006 | Moore et al. | ................... | 428/447 |
| 7,704,600 B2 | 4/2010 | Dams et al. | | |
| 7,955,757 B2 * | 6/2011 | Hirashige et al. | ............. | 429/530 |
| 2005/0136180 A1 * | 6/2005 | Pellerite et al. | ............... | 427/162 |
| 2008/0199724 A1 * | 8/2008 | Haga et al. | ................... | 428/688 |

FOREIGN PATENT DOCUMENTS

| | | | |
|---|---|---|---|
| JP | 05-326316 | A | 12/1993 |
| JP | 10-214741 | A | 8/1998 |
| JP | 11-154783 | A | 6/1999 |
| JP | 2002-289464 | A | 10/2002 |
| JP | 2002-289465 | A | 10/2002 |
| JP | 2004-022611 | A | 1/2004 |
| JP | 2005-504696 | T | 2/2005 |
| JP | 2007-238747 | A | 9/2007 |
| WO | 2008/059654 | A1 | 5/2008 |

OTHER PUBLICATIONS

International Search Report; PCT/JP2009/006493; Mar. 9, 2010.
S.Koike; Written Opinion of the International Searching Authority; PCT/JP2009/006493; Mar. 9, 2010.

\* cited by examiner

*Primary Examiner* — Brian K Talbot
(74) *Attorney, Agent, or Firm* — Studebaker & Brackett PC

(57) ABSTRACT

A method for manufacturing a ceramic electronic component capable of preventing degradation of the self alignment property and product characteristics due to absorption of flux into pores of a ceramic element assembly during soldering in mounting and a ceramic electronic component. In the method, a ceramic element assembly is subjected to an oil-repellent treatment by using an oil-repellent agent containing a polyfluoropolyether compound as a primary component and hydrofluoroether as a solvent, so as to avoid absorption of the flux by the ceramic element assembly.

18 Claims, 5 Drawing Sheets

WITH OIL-REPELLENT TREATMENT

NO OIL-REPELLENT TREATMENT

WITH OIL-REPELLENT TREATMENT

NO OIL-REPELLENT TREATMENT

SEGREGATED ELEMENT

METHOD FOR MANUFACTURING CERAMIC ELECTRONIC COMPONENT

CROSS REFERENCE TO RELATED APPLICATIONS

The present application is a continuation of International Application No. PCT/JP2009/006493, filed Dec. 1, 2009, which claims priority to Japanese Patent Application No. 2008-334072 filed Dec. 26, 2008, the entire contents of each of these applications being incorporated herein by reference in their entirety.

TECHNICAL FIELD

The invention relates to a ceramic electronic component and a method for manufacturing the same. In particular, the invention relates to a ceramic electronic component in which external electrodes are disposed on the surface of a ceramic element assembly constituting the ceramic electronic component and a method for manufacturing the same.

BACKGROUND

In recent years, surface mount ceramic electronic components (for example, a ceramic inductor by using magnetic ceramic, a ceramic capacitor by using dielectric ceramic, a ceramic piezoelectric component by using piezoelectric ceramic, and the like), which is mounted by soldering external electrodes formed on the surface of a ceramic element assembly to lands disposed on a wiring board on the basis of a method, e.g., by way of reflow soldering, or the like, have been used widely.

However, pores are present in the surface of the ceramic element assembly, which is a sintered body, and flux contained in solder is absorbed into the pores of the ceramic element assembly during soldering. As a result, each granular solder is melted as-is while the fine granular shape is kept and a continuous liquid having fluidity is not formed. Therefore, a problem occurs in that a self alignment property (a characteristic in which molten solder arrives in a gap and the like between an external electrode and a land and, thereby, a ceramic electronic component is mounted at a predetermined position, e.g., on the land of a mount board, reliably) is degraded. In addition, a problem occurs in that the reliability in connection between an external electrode and a land is degraded.

Meanwhile, from the viewpoint of promoting solderability of the external electrode, for example, formation of a plating film has been widely performed (e.g., a Ni plating film or a Sn plating film on an Ag electrode serving as an external electrode main body (substrate layer)). However, there is a problem in that a plating solution, wash water, and the like infiltrate into the inside of a ceramic element assembly during a plating step and, thereby, electrical characteristics are degraded. To solve this problem, a method for manufacturing an electronic component has been proposed where an organosilicon compound is formed through dehydration-condensation on a ceramic element assembly surface, pore portions opened at the surface, and external electrodes. See, Japanese Unexamined Patent Application Publication No. 10-214741 (Patent Document 1).

In this regard, it is mentioned that according to this method, infiltration of a plating solution, water, and the like into the inside of the ceramic element assembly is prevented and, thereby, degradation of the electrical characteristics can be suppressed.

Furthermore, regarding the soldering technology used in mounting of a ceramic electronic component, a composition containing a polymer including a polymerization unit of an unsaturated ester having a polyfluoroalkyl group, a fluorine based surfactant, and an aqueous medium has been proposed as a composition to prevent solder flux wicking. See, Japanese Unexamined Patent Application Publication No. 11-154783 (Patent Document 2).

In this regard, it is mentioned that in the case where this composition is used, absorption of the flux into pores of the ceramic element assembly during soldering can be prevented.

SUMMARY

The present disclosure provides a method for manufacturing a ceramic electronic component capable of preventing degradation of the self alignment property due to absorption of the flux into pores of a ceramic element assembly during soldering in mounting and a ceramic electronic component which can be produced by the above-described method and which exhibits high reliability in mounting.

In a disclosed embodiment, a method for manufacturing a ceramic electronic component with a ceramic element assembly and external electrodes provided on the surface of the ceramic element assembly includes performing an oil-repellent treatment by forming the external electrodes on the surface of the ceramic element assembly and subjecting the ceramic element assembly to an oil-repellent treatment through the use of an oil-repellent treatment agent, so as to form a flux infiltration preventing film on the surface of the ceramic element assembly. The oil-repellent treatment agent contains a polyfluoropolyether compound, which includes at least one

in which OR represents a methoxy group or an ethoxy group, as a primary component and hydrofluoroether as a solvent.

In another disclosed embodiment, a method for manufacturing a ceramic electronic component provided with a ceramic element assembly and external electrodes, which are provided on the surface of the ceramic element assembly and which have plating films on the surfaces, includes performing an oil-repellent treatment by forming the plating films on the surfaces of the external electrodes and subjecting the ceramic element assembly to an oil-repellent treatment through the use of an oil-repellent treatment agent, so as to form a flux infiltration preventing film on the surface of the ceramic element assembly, wherein the oil-repellent treatment agent contains a polyfluoropolyether compound, which includes at least one

in which OR represents a methoxy group or an ethoxy group, as a primary component and hydrofluoroether as a solvent.

In another embodiment of the disclosure, a method for manufacturing a ceramic electronic component provided with a ceramic element assembly and external electrodes, which are provided on the surface of the ceramic element assembly and which have plating films on the surfaces, includes performing an oil-repellent treatment by subjecting the ceramic element assembly to an oil-repellent treatment, after formation of the external electrodes and before formation of the plating films, through the use of an oil-repellent treatment agent, so as to form a flux infiltration preventing film on the surface of the ceramic element assembly, wherein the oil-repellent treatment agent contains a polyfluoropolyether compound, which includes at least one $$—CONH(CH_2)_3Si(OR)_3,$$

in which OR represents a methoxy group or an ethoxy group, as a primary component and hydrofluoroether as a solvent.

In a more specific embodiment, the polyfluoropolyether compound in the above-described oil-repellent treatment agent is at least one type selected from the group consisting of the compounds described in the following items (I), (II), (III), (IV), (V), and (VI):

$$C_3F_7O(CF(CF_3)CF_2O)yCF(CF_3)\text{-}A \qquad (I)$$

$$CF_3O(C_2F_4O)yCF_2\text{-}A \qquad (II)$$

$$A\text{-}CF_2O(CF_2O)x(C_2F_4O)yCF_2\text{-}A \qquad (III)$$

$$A\text{-}CF_2O(C_2F_4O)xCF_2\text{-}A \qquad (IV)$$

$$A\text{-}CF(CF_3)O(CF(CF_3)CF_2O)yCF(CF_3)\text{-}A \qquad (V)$$

$$A\text{-}(CF_2)_3O(C_4F_8O)y(CF_2O)_3\text{-}A \qquad (VI)$$

where A represents at least one type selected from the group consisting of $$—CONH(CH_2)_3Si(OR)_3 \qquad (a)$$

(where OR represents a methoxy group or an ethoxy group)

$$(C_nF_{2n+1}) \qquad (b)$$

$$(C_nF_{2n+1}O) \qquad (c)$$

$$(HC_nF_{2n}O) \qquad (d)$$

$$(HC_nF_{2n+1}O) \qquad (e)$$

and in the structural formulae in the items (I) to (VI), at least one of A is $—CONH(CH_2)_3Si(OR)_3$ in the above-described item (a), x represents 1 to 50, y represents 4 to 40, and n represents 1 to 4.

That is, regarding the polyfluoropolyether compound in the oil-repellent treatment agent used in the present invention, A in each of the structural formulae (molecules) of the above-described items (I) and (II) is always that in the above-described item (a), one A in each of the structural formulae (molecules) of the items (III) and (VI) is always that in the above-described item (a), and the other A may be any one of those in the above-described items (a) to (e).

In another more specific embodiment, the oil-repellent treatment may be performed by using the above-described oil-repellent treatment agent having a polyfluoropolyether compound concentration of 0.04 to 0.5 percent by weight.

In another more specific embodiment, an oil-repellent treatment agent removal step to remove an excess oil-repellent treatment agent may be included immediately after the above-described oil-repellent treatment step.

In yet another more specific embodiment of the disclosure, a washing step to wash the above-described ceramic element assembly with hydrofluoroether may be included after the above-described oil-repellent treatment agent removal step.

In another more specific embodiment, the step to heat-treat the above-described ceramic element assembly may be included between the above-described oil-repellent treatment agent removal step and the above-described washing step.

In another more specific embodiment, the ceramic constituting the above-described ceramic element assembly may be NiCuZn ferrite.

In another embodiment of the disclosure, a ceramic electronic component includes a ceramic element assembly and external electrodes provided on the surface of the ceramic element assembly. At least F, Si, and N are detected from the surface of the ceramic constituting the ceramic element assembly. The atomic concentration ratios of the individual above-described elements relative to the ceramic surface satisfy the requirements: $2 \leq (F/\text{ceramic element assembly}) \leq 12$, $0.1 \leq (Si/\text{ceramic element assembly}) \leq 1.0$, and $0.1 \leq (N/\text{ceramic element assembly}) \leq 1.3$.

In this regard, the "ceramic element assembly" in each of the above-described formulae refers to the total atomic concentration of elements detected from the ceramic element assembly.

In another disclosed embodiment, a ceramic electronic component includes a ceramic element assembly and external electrodes provided on the surface of the ceramic element assembly. At least F, Si, and N are detected from the surface of the ceramic constituting the ceramic element assembly and the surface of the external electrode. The atomic concentration ratios of the individual elements of F, Si, and N at the surface of the ceramic relative to the ceramic surface satisfy the requirements: $2 \leq (F/\text{ceramic element assembly}) \leq 12$, $0.1 \leq (Si/\text{ceramic element assembly}) \leq 1.0$, and $0.1 \leq (N/\text{ceramic element assembly}) \leq 1.3$. The atomic concentration ratios of the individual elements of F, Si, and N at the surface of the external electrode to the external electrode surface satisfy the requirements: $0.4 \leq (F/\text{external electrode}) \leq 10$, $0.06 \leq (Si/\text{external electrode}) \leq 0.8$, and $0.07 \leq (N/\text{external electrode}) \leq 1.0$.

In this regard, the "ceramic element assembly" in each of the above-described formulae refers to the total atomic concentration of elements detected from the ceramic element assembly, where component elements of the oil-repellent treatment agent and an oxygen element are excluded.

Furthermore, the "external electrode" in each of the above-described formulae refers to the total atomic concentration of elements detected from the external electrode, where component elements of the oil-repellent treatment agent and an oxygen element are excluded.

DETAILED DESCRIPTION

The inventors realized that in the case of the method of forming organosilicon compound through dehydration-condensation on a ceramic element assembly surface, pore portions opened at the surface and external electrodes, such as described in Patent Document 1, absorption of the flux into pores of the ceramic element assembly during soldering cannot be prevented. Hence, the problem of degradation of the self alignment property has not been practically solved.

Additionally, the inventors realized that in using the composition as described in Patent Document 2 to prevent solder flux wicking, where the composition contains a polymer including a polymerization unit of an unsaturated ester having a polyfluoroalkyl group, a fluorine based surfactant, and an aqueous medium, if coating is performed after formation of the plating film, the film thickness is large and, thereby, there are problems in that not only defective conduction occurs, but also poor wettability occurs during mounting because the wettability of the external electrode with the solder is degraded. Moreover, if coating is performed before formation of the plating film, the solderability is poor and, for example, in the case where nickel plating is performed, there is a problem in that the continuity of the Ni plating is degraded.

Features of embodiments of the disclosure will be described below in further detail with reference to the drawings.

Figure 1:
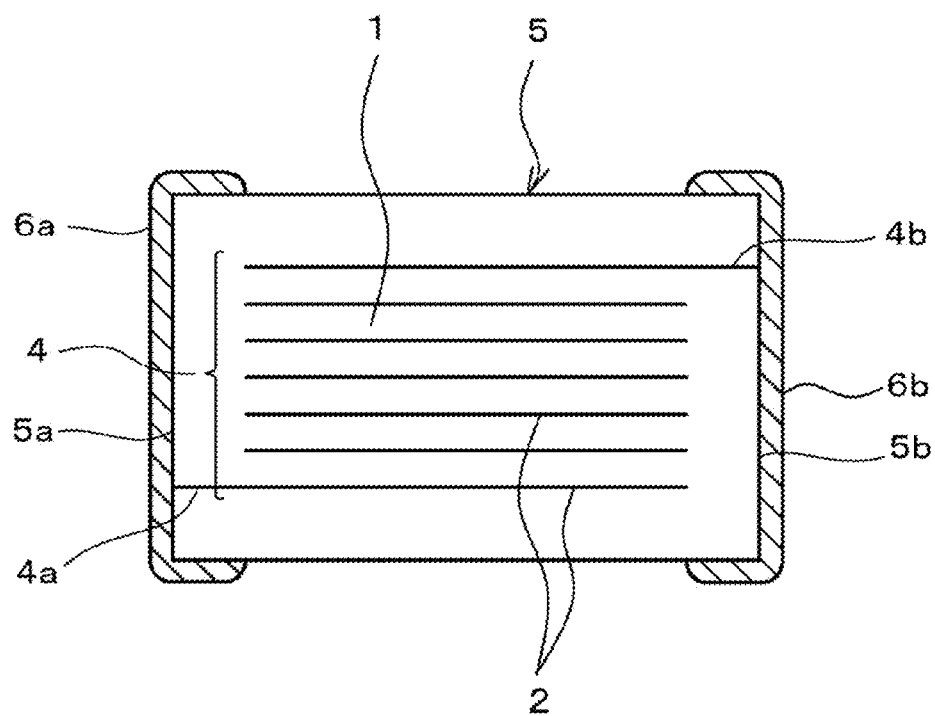
FIG. 1 is a front sectional view showing the configuration of a ceramic electronic component (monolithic ceramic inductor) according to an exemplary embodiment.
Figure 2:
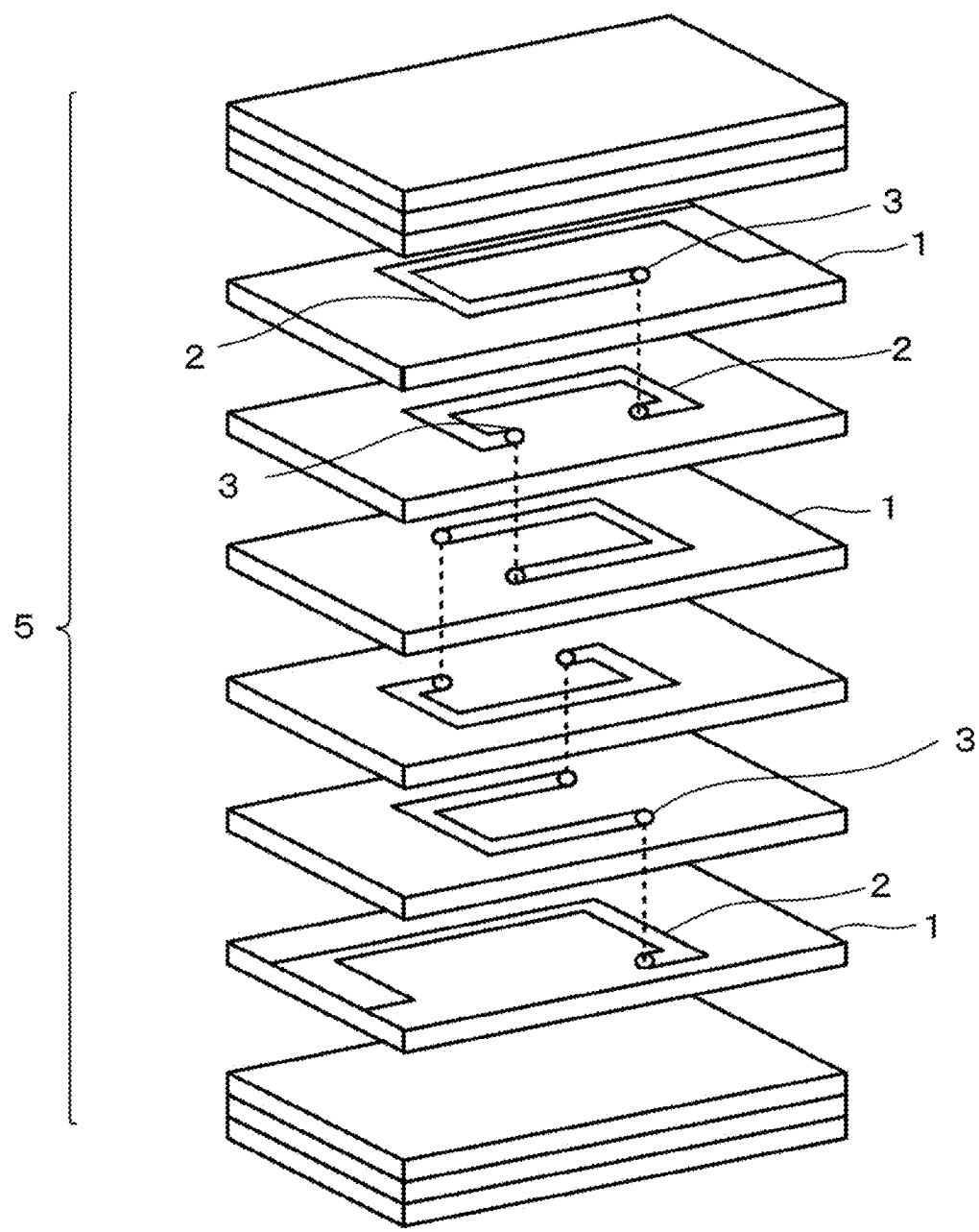
FIG. 2 is an exploded perspective view schematically showing the configuration of a key portion of a monolithic ceramic inductor according to an exemplary embodiment.

FIG. 1 is a sectional view showing the configuration of a monolithic coil component (in Example 1, a monolithic ceramic inductor) according to an exemplary embodiment (Example 1); and FIG. 2 is an exploded perspective view schematically showing the configuration of a key portion thereof.

As shown in FIG. 1 and FIG. 2, the monolithic ceramic inductor of Example 1 is provided with a ceramic element assembly (ferrite element assembly) 5 having a coil 4 formed by connecting the individual coil conductors (coil patterns) 2 provided on the individual ferrite layers 1 with via holes 3 (FIG. 2). External electrodes 6a and 6b are provided on end surfaces 5a and 5b of the ceramic element assembly (ferrite element assembly) 5 in such a way as to be electrically connected to respective lead electrodes 4a and 4b at both end portions of the coil 4.

An exemplary manufacturing method will now be described.

Materials prepared by weighing ferric oxide ($Fe_2O_3$), zinc oxide (ZnO), nickel oxide (NiO), and copper oxide (CuO) at a predetermined ratio were served as raw materials and were charged into a ball mill, and wet-blending was performed for a predetermined time.

A powder obtained by drying and pulverizing the wet-blended mixture was calcined at 700° C. for 1 hour. The resulting calcined powder was wet-pulverized with a ball mill for a predetermined time and, thereafter, drying and disintegration were performed, so as to obtain a ferrite powder.

A binder resin, a plasticizer, a humectant, and a dispersing agent were added to the resulting ferrite powder, and mixing was performed with a ball mill for a predetermined time. Thereafter, defoaming was performed under reduced pressure.

The resulting slurry was applied to a peelable film by using a lip coater or a multicoater and was dried, so as to obtain long lengths of ferrite green sheet having a desired film thickness.

The resulting long lengths of ferrite green sheet was cut into a predetermined dimension, and via holes were formed by a laser beam machining method or the like, so that a ferrite sheet provided with via holes at predetermined positions was obtained.

A conductor paste containing silver or a silver alloy as a primary component was applied to the resulting ferrite sheet by a screen printing method or the like in such a way that a predetermined pattern is formed. Heat-drying was performed, so that an electrode forming ferrite sheet provided with a coil conductor was obtained.

The resulting electrode forming ferrite sheets were stacked in such a way that a coil is formed through interlayer connection of the coil conductors, and ferrite green sheets, to which the conductor paste was not applied, were stacked on and under the resulting laminate, so as to obtain an unfired laminate.

In this regard, when the electrode forming ferrite sheets provided with the coil conductor were laminated, the coil conductors were interlayer-connected through the above-described via holes, so that a coil is formed in the inside of the unfired laminate.

Then, the resulting unfired laminate was contact bonded at 45° C. and a pressure of 1.0 t/$cm^2$. Subsequently, the resulting contact bonded laminate was cut into a predetermined dimension by a method of dicing with a dicer, cutting with a force-cutting blade, or the like.

An unfired monolithic ceramic inductor was subjected to debindering under a predetermined condition, followed by firing. Debindering was performed under the condition of heating in a low-oxygen atmosphere at 500° C. for 2 hours. Firing was performed under the condition of firing in an air atmosphere at 870° C. for 150 minutes. In this manner, a ceramic element assembly (ferrite element assembly) 5 provided with a coil 4 prepared by connecting the individual coil conductors (coil patterns) 2 disposed, or provided on the individual ferrite layers 1 through via holes 3 was formed, as shown in FIG. 1 and FIG. 2.

In this regard, FIG. 1 shows the monolithic ceramic inductor in which the external electrodes 6a and 6b were formed on the end surfaces 5a and 5b of the ceramic element assembly (ferrite element assembly) 5.

The external electrode main bodies (substrate layers) were formed by applying an electrode material paste for forming the external electrode to the end surfaces 5a and 5b, at which the lead electrodes 4a and 4b were exposed, of both end portions of the coil 4 of the resulting ceramic element assembly (ferrite element assembly) 5 by a dipping method, performing drying at 120° C. for 10 minutes, and baking the electrode material paste at 800° C. for 15 minutes.

Next, an oil-repellent treatment was performed by a method described below.

An oil-repellent treatment agent containing a compound represented by A-$CF_2O(CF_2O)x(C_2F_4O)yCF_2$-A, where A: —$CONH(CH_2)_3Si(OCH_3)_3$, x, y: 8 to 12, and hydrofluoroether serving as a solvent was prepared.

The oil-repellent treatment agent was put into a container, and the ceramic element assembly in which the electrode main bodies (substrate layers) were formed by baking the electrode material paste, as described above, was dipped therein for about 5 minutes.

Thereafter, the ceramic element assembly was taken out of the oil-repellent treatment agent and was subjected to liquid removal by a method in which contact with a gas stream was effected through aspiration. Subsequently, a heat treatment was performed at 80° C. for about 30 minutes.

In this manner, flux infiltration preventing films were formed on the surface of the ceramic element assembly and the surfaces of the external electrode main bodies (substrate layers).

Two-layer structure plating films composed of a Ni plating film serving as a lower layer and a Sn plating film (or a solder plating film) serving as an upper layer were formed on the external electrode main bodies (substrate layers).

In this manner, a monolithic ceramic inductor, in which the flux infiltration preventing film was formed on the surface of the ceramic element assembly and the surfaces of the external electrode main bodies (substrate layers), was obtained (refer to FIG. 1). In this regard, the flux infiltration preventing films and the Ni and Sn plating films are not shown in FIG. 1.

An evaluation of characteristics will now be described with respect to the ceramic element assembly of Example 1, formed as described above.

Regarding the monolithic ceramic inductor of Example 1 produced through the oil-repellent treatment step, as described above, and a monolithic ceramic inductor produced with no oil-repellent treatment for the purpose of comparison (Comparative example 1), a test to examine the mountability (self alignment test) was performed to examine the mountability (i.e., self alignment property) of the monolithic ceramic inductor.

Regarding the self alignment test, in order to cause an occurrence of deviation in mounting intentionally, the monolithic ceramic inductor was placed on the land of a mounting substrate (ceramic circuit board) in such a way that the position of the mounting coordinates was deviated by 150 μm from the center in the width direction (W direction) of the monolithic ceramic inductor. The external electrodes of the monolithic ceramic inductor were mounted through soldering on the lands by a reflow soldering method. The self alignment property was evaluated by examining whether the deviated monolithic ceramic inductor was returned to the proper mounting position after reflow.

Figure 3A:
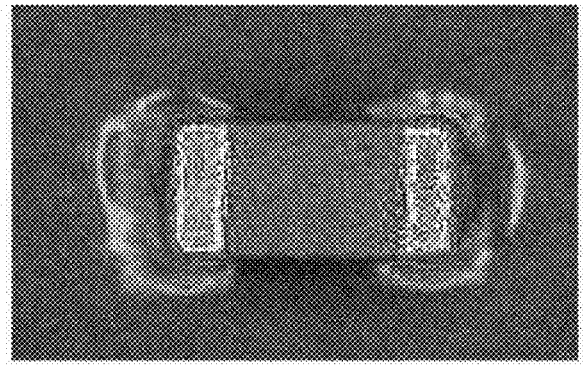
FIG. 3A is an image showing a mounting state of a monolithic ceramic inductor according to an exemplary embodiment.
Figure 3B:
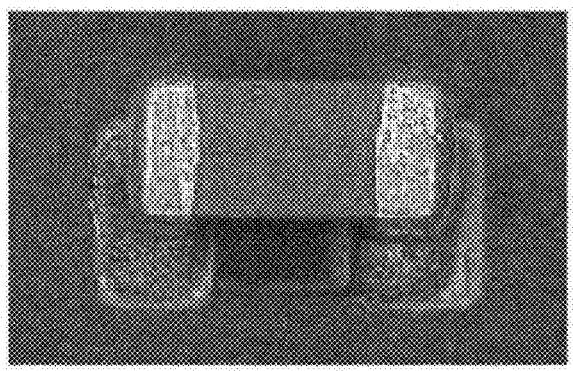
FIG. 3B is an image showing a mounting state of a monolithic ceramic inductor according to a comparative example.

FIG. 3A shows a mounting state of the monolithic ceramic inductor according to Example 1 of the present embodiment in which the oil-repellent treatment was performed. FIG. 3B shows a mounting state of the monolithic ceramic inductor according to Comparative example 1 in which the oil-repellent treatment was not performed.

Figure 4A:
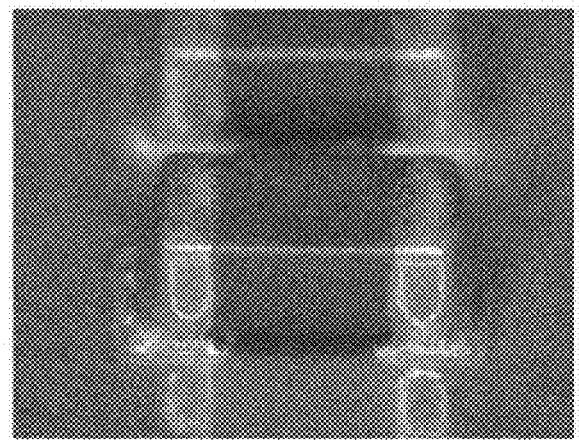
FIG. 4A is an image showing a soldering state of a monolithic ceramic inductor according to an exemplary embodiment.

FIG. 4A shows a soldering state of the monolithic ceramic inductor according to Example 1 of the present embodiment in which the oil-repellent treatment was performed.

Figure 4B:
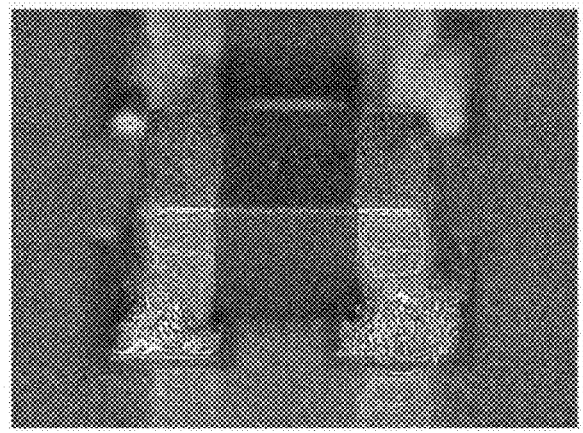
FIG. 4B is an image showing a soldering state of a monolithic ceramic inductor according to a comparative example.

FIG. 4B shows a soldering state of the monolithic ceramic inductor according to Comparative example 1 in which the oil-repellent treatment was not performed.

Regarding the monolithic ceramic inductor according to Example 1 of the present embodiment, in which the oil-repellent treatment was performed, as shown in FIG. 3A, the mounting position after reflow was returned to the predetermined position and, therefore, it was ascertained that the self alignment property was good.

Furthermore, the soldering state of the monolithic ceramic inductor according to Example 1 of the present embodiment, in which the oil-repellent treatment was performed, was examined. As a result, as shown in FIG. 4A, favorable wetting with the solder was ascertained.

On the other hand, regarding the monolithic ceramic inductor according to Comparative example 1 in which the oil-repellent treatment was not performed, as shown in FIG. 3B, the degree of returning after reflow was low, and therefore it was ascertained that the self alignment property was poor.

Furthermore, the soldering state of the monolithic ceramic inductor according to Comparative example 1, in which the oil-repellent treatment was not performed, was examined. As a result, as shown in FIG. 4B, the solder was solidified while keeping the granular shape and, therefore, it was ascertained that the solder was in a so-called "cold solder joint state".

Figure 5A:
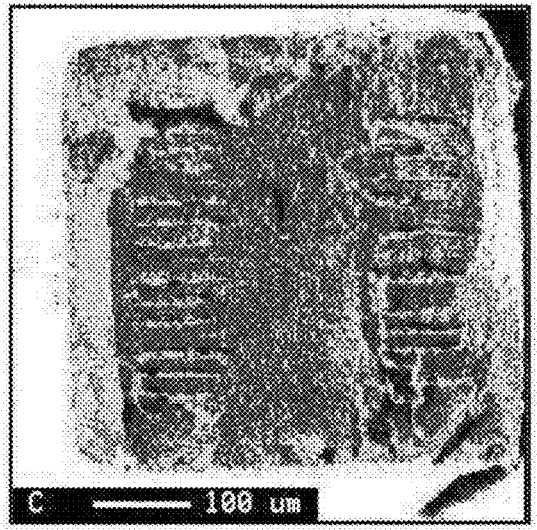
FIG. 5A is an element mapping diagram of C on the basis of fluorescent X-ray analysis (WDX) in the case where a monolithic ceramic inductor according to an exemplary embodiment is mounted.
Figure 5B:
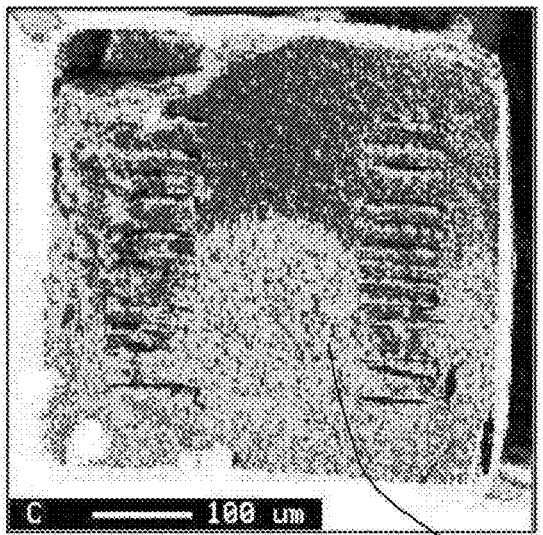
FIG. 5B is an element mapping diagram of C on the basis of fluorescent X-ray analysis (WDX) in the case where a monolithic ceramic inductor according to a comparative example is mounted.

In order to study the state of absorption of the flux into the ceramic element assembly, the monolithic ceramic inductor after the above-described self alignment test was removed from the mounting substrate, and an element mapping of the C element contained in the flux was examined on the basis of wavelength dispersive fluorescent X-ray analysis (WDX). As a result, in the case of the monolithic ceramic inductor according to Example 1 of the present embodiment, as shown in FIG. 5A, segregation of the C element from the mounting substrate side toward the ceramic element assembly (ferrite element assembly) was not observed. However, in the case of the monolithic ceramic inductor according to Comparative example 1, as shown in FIG. 5B, segregation of the C element from the mounting substrate side toward the ceramic element assembly was observed.

From Example 1, it is believed that regarding the monolithic ceramic inductor according to Comparative example 1 in which the oil-repellent treatment was not performed, in reflow, the flux in the solder paste was absorbed into the ceramic element assembly, an oxide film of molten solder ball was not removed, the solder came into a so-called "cold solder joint state", a force to pull the monolithic ceramic inductor back was not generated and, thereby, the self alignment property was poor.

On the other hand, regarding the monolithic ceramic inductor according to Example 1 of the present embodiment, in which the oil-repellent treatment was performed, the flux infiltration preventing film was provided on the surface of the ceramic element assembly, absorption of the flux into the ceramic element assembly was prevented, and a good self alignment property was obtained.

As for other comparative examples, a monolithic ceramic inductor of Comparative example 2 was produced in the same manner as that of the monolithic ceramic inductor of Example 1 described above except that a water-repellent treatment was performed by using water-repellent $CH_3(CH_2)_9Si(OCH_3)_3$ after formation of the external electrode main bodies and before formation of the plating films (the oil-repellent treatment in the above-described example was not performed). In addition, a monolithic ceramic inductor of Comparative example 3 was produced in the same manner as that of the monolithic ceramic inductor of Example 1 described above except that a water-repellent treatment was performed by using water-repellent $CF_3CH_2CH_2Si(OCH_3)_3$ after formation of the external electrode main bodies and before formation of the plating films (the oil-repellent treatment in the above-described example was not performed).

Regarding these monolithic ceramic inductors of Comparative examples 2 and 3 as well, the self alignment properties were evaluated.

As a result, it was ascertained that the self alignment properties of the monolithic ceramic inductors of Comparative examples 2 and 3 were also poor as that of Comparative example 1 described above. Regarding comparative examples 2 and 3 as well, in reflow, the flux in the solder paste was absorbed into the ceramic element assembly, an oxide film of molten solder ball was not removed, the solder came into a so-called "cold solder joint state", a force to pull the monolithic ceramic inductor back was not generated and, thereby, the self alignment property was poor.

Table 1 shows the evaluation results of the self alignment properties of the monolithic ceramic inductor of Example 1 and the monolithic ceramic inductors of Comparative examples 1 to 3 collectively.

TABLE 1

|  | Oil-repellent treatment | Self alignment property |
|---|---|---|
| Example 1 | with oil-repellent treatment | ⊙ |
| Comparative example 1 | no oil-repellent treatment | X |
| Comparative example 2 | with water-repellent treatment $CH_3(CH_2)_9Si(OCH_3)_3$ was used as water-repellent treatment agent | X |
| Comparative example 3 | with water-repellent treatment $CF_3CH_2CH_2Si(OCH_3)_3$ was used as water-repellent treatment agent | X |

In Table 1, the symbol ⊙ indicates that the self alignment property is good, and the symbol x indicates that the self alignment property is poor. As described above, the monolithic ceramic inductor of Example 1 is provided with an excellent self alignment property, but the self alignment properties of the monolithic ceramic inductors of Comparative examples 1 to 3 are poor.

Additionally, the flux infiltration preventing film of the monolithic ceramic inductor according to the example of the present embodiment is very thin. Therefore, it was ascertained that even when the flux infiltration preventing film was formed by performing the oil-repellent treatment after formation of the external electrode main bodies (substrate layers) and before formation of the plating films, the continuity of the Ni plating formed in the plating step thereafter is not impaired.

In another exemplary embodiment, Example 2, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes.

The external electrode main bodies (substrate layers) were formed by baking the electrode material paste at 800° C. for 15 minutes.

Subsequently, two-layer structure plating films composed of a Ni plating film serving as a lower layer and a Sn plating film (or a solder plating film) serving as an upper layer were formed on the external electrode main bodies (substrate layers), so that a monolithic ceramic inductor (refer to FIG. 1) was obtained.

Next, an oil-repellent treatment was performed by a method described below.

An oil-repellent treatment agent containing a compound represented by $A-CF_2O(CF_2O)x(C_2F_4O)yCF_2-A$,
where A: —$CONH(CH_2)_3Si(OCH_3)_3$,
x, y: 8 to 12,
and hydrofluoroether serving as a solvent was prepared.

The oil-repellent treatment agent was put into a container, and the ceramic element assembly (monolithic ceramic inductor) in which the external electrodes were formed by baking the electrode material paste and plating films were further formed, as described above, was dipped therein for about 5 minutes.

Thereafter, the ceramic element assembly was taken out of the oil-repellent treatment agent and was subjected to liquid removal by a method in which contact with a gas stream was effected through aspiration. Subsequently, a heat treatment was performed at 80° C. for about 30 minutes.

In this manner, a monolithic ceramic inductor, in which flux infiltration preventing films were formed on the surface of the ceramic element assembly and the surfaces of the external electrode main bodies, was obtained (refer to FIG. 1). In this regard, the flux infiltration preventing films and the Ni and Sn plating films are not shown in FIG. 1, as described above.

Regarding the monolithic ceramic inductor of Example 2, the self alignment property was evaluated on the basis of comparison with those of the monolithic ceramic inductors of Comparative examples 1 to 3 produced in Example 1.

As a result, it was ascertained that, as in the case of Example 1, the monolithic ceramic inductor of Example 2 was excellent in the self alignment property as compared with those of the monolithic ceramic inductors of Comparative examples 1 to 3.

Additionally, the flux infiltration preventing film of the monolithic ceramic inductor of Example 2 was very thin. Therefore, it was ascertained that even when the flux infiltration preventing films were formed on the surface of the ceramic element assembly and the surfaces of the external electrodes by performing the oil-repellent treatment after formation of the plating films were formed, there was no problem in the solderability and the conduction.

Moreover, it was ascertained that the flux infiltration preventing films were disposed, or provided on the plating films and, therefore, oxidation of the plating films provided on the external electrode main bodies (substrate layers) was suppressed and prevented, so as to improve the reliability.

In another embodiment, Example 3, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes. The external electrode main bodies (substrate layers) were formed by baking the electrode material paste at 800° C. for 15 minutes.

Subsequently, two-layer structure plating films composed of a Ni plating film serving as a lower layer and a Sn plating film (or a solder plating film) serving as an upper layer were formed on the external electrode main bodies (substrate layers).

Then, an oil-repellent treatment was performed by a method described below.

Initially, hydrofluoroether was used, and treating solutions having a concentration of polyfluoropolyether compound serving as an oil-repellent treatment agent of 0.5 percent by weight, 0.2 percent by weight, 0.1 percent by weight, 0.05 percent by weight, and 0.04 percent by weight were prepared.

Subsequently, each of treating solutions, in which the concentrations were adjusted as described above, was used, and the oil-repellent treatment of the above-described ceramic element assembly (monolithic ceramic inductor) provided with the external electrodes produced by forming plating films on the external electrode main bodies (substrate layers) was performed.

In this manner, a monolithic ceramic inductor, in which flux infiltration preventing films were formed on the surface of the ceramic element assembly and the surfaces of the external electrode main bodies, was obtained (refer to FIG. 1). In this regard, the flux infiltration preventing films and the Ni and Sn plating films are not shown in FIG. 1, as described above.

Regarding the monolithic ceramic inductor obtained in Example 3, the self alignment property, the solderability, and the conduction of the external electrode were evaluated.

The results thereof are shown in Table 2.

TABLE 2

| Oil-repellent treatment agent component concentration (percent by weight) | Self alignment property | Solderability | Conduction |
|---|---|---|---|
| 0.5 | ⊙ | ⊙ | ⊙ |
| 0.2 | ⊙ | ⊙ | ⊙ |

TABLE 2-continued

| Oil-repellent treatment agent component concentration (percent by weight) | Self alignment property | Solderability | Conduction |
|---|---|---|---|
| 0.1 | ⊙ | ⊙ | ⊙ |
| 0.05 | ⊙ | ⊙ | ⊙ |
| 0.04 | ⊙ | ⊙ | ⊙ |

In Table 2, each of good characteristics is indicated by the symbol ⊙.

It was ascertained that each of the monolithic ceramic inductors subjected to the oil-repellent treatment by using the treating solutions having concentrations of polyfluoropolyether compound serving as an oil-repellent treatment agent adjusted to be 0.5 percent by weight, 0.2 percent by weight, 0.1 percent by weight, 0.05 percent by weight, and 0.04 percent by weight had good characteristics with respect to all the self alignment property, the solderability, and the conduction of the external electrode.

In this regard, although not shown in Table 2, it was ascertained that if the concentration of polyfluoropolyether compound serving as an oil-repellent treatment agent was 0.5 percent by weight or more, the thickness of the flux infiltration preventing film became too large, and the solderability and the conduction tend to be degraded, whereas if the concentration was less than 0.04 percent by weight, the thickness of the flux infiltration preventing film became too small, and an effect of preventing absorption of the flux tends to be degraded.

Furthermore, regarding the monolithic ceramic inductor produced in Example 3 as well, it was ascertained that the flux infiltration preventing films were provided on the plating films provided on the external electrode main bodies (substrate layers) and, therefore, oxidation of the plating films was suppressed and prevented, so as to improve the reliability.

In another embodiment, Example 4, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes. The external electrode main bodies (substrate layers) were formed by baking the electrode material paste at 800° C. for 15 minutes.

Subsequently, two-layer structure plating films composed of a Ni plating film serving as a lower layer and a Sn plating film (or a solder plating film) serving as an upper layer were formed on the external electrode main bodies (substrate layers).

Next, an oil-repellent treatment was performed by a method described below.

An oil-repellent treatment agent containing a compound represented by A-CF$_2$O(CF$_2$O)x(C$_2$F$_4$O)yCF$_2$-A,
where A: —CONH(CH$_2$)$_3$Si(OCH$_3$)$_3$,
x, y: 8 to 12,
and hydrofluoroether serving as a solvent was prepared.

Then, the oil-repellent treatment agent was put into a container, and the ceramic element assembly (monolithic ceramic inductor) in which the external electrode main bodies were formed by baking the electrode material paste and plating films were further formed, as described above, was dipped therein for about 5 minutes.

Immediately after the dipping was finished, liquid removal was performed, so that excess oil-repellent treatment solution on the ceramic element assembly was removed.

In Example 4, liquid removal was performed by a method in which large numbers of ceramic element assemblies were put into a net basket shaped container having a diameter of little less than about 12 cm, this net basket shaped container was put into a tubular liquid removal jig having a diameter of 12 cm, aspiration was performed from below and, thereby, a gas (air) was passed through the liquid removal jig from above downward. The time of liquid removal was specified to be 150 seconds. In Example 4, liquid removal was performed while the degree of aspiration was specified to be 3.0 kPa on a differential pressure basis relative to atmospheric pressure and the flow rate of the air was specified to be 5 m³/min.

After the liquid removal was finished, the ceramic element assembly was heat-treated at 80° C. for about 30 minutes.

In this manner, a monolithic ceramic inductor, in which the flux infiltration preventing films were formed on the surface of the ceramic element assembly and the surfaces of the external electrodes, was obtained (refer to FIG. 1). In this regard, the flux infiltration preventing films and the Ni and Sn plating films are not shown in FIG. 1, as described above.

Regarding the resulting monolithic ceramic inductor, the self alignment property was examined. As a result, it was ascertained that the self alignment property better than the property in the case where liquid removal was not performed was obtained. In this regard, while the self alignment property practically having no problem can be usually obtained without performing liquid removal, a good self alignment property can be obtained more reliably by employing a step to remove an excess oil-repellent treatment solution through liquid removal.

That is, in the case where large numbers of ceramic element assemblies are subjected to the oil-repellent treatment and, thereafter, the ceramic element assemblies are put into a net basket or a sieve so as to be subjected to liquid removal, a treatment solution may be retained in portions where the ceramic element assemblies are overlapped and there are places, to which the oil-repellent treatment agent adheres excessively, in some cases. However, it is possible to remove an excess oil-repellent treatment solution efficiently and prevent excessive adhesion of the oil-repellent treatment agent by performing liquid removal forcedly by an aspiration liquid removal method or the like. Therefore, it can be preferable to perform liquid removal depending on the circumstances taking the production cost and the like into consideration.

The liquid removal method is not limited to the above-described aspiration liquid removal method, and it is possible to apply, for example, a method in which a gas stream and the ceramic element assembly are brought into contact with each other by blowing (push in) the air and a method by using a centrifugal force.

In another exemplary embodiment, Example 5, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes. The external electrode main bodies (substrate layers) were formed by baking the electrode material paste at 800° C. for 15 minutes.

Subsequently, two-layer structure plating films composed of a Ni plating film serving as a lower layer and a Sn plating film (or a solder plating film) serving as an upper layer were formed on the external electrode main bodies (substrate layers).

Next, an oil-repellent treatment was performed by a method described below.

An oil-repellent treatment agent containing a compound represented by A-CF$_2$O(CF$_2$O)x(C$_2$F$_4$O)yCF$_2$-A, where A: —CONH(CH$_2$)$_3$Si(OCH$_3$)$_3$, x, y: 8 to 12, and hydrofluoroether serving as a solvent was prepared.

Then, the oil-repellent treatment agent was put into a container, and the ceramic element assembly (monolithic ceramic inductor) in which the external electrode main bodies were formed by baking the electrode material paste and plating films were further formed, as described above, was dipped therein for about 5 minutes.

Immediately after the dipping was finished, aspiration liquid removal was performed by the same method as the method in Example 4 described above and under the same condition, so that excess oil-repellent treatment solution on the ceramic element assembly was removed.

The ceramic element assembly, from which an excess oil-repellent treatment solution was removed, was heat-treated at 80° C. for about 30 minutes.

Then, the ceramic element assembly was subjected to ultrasonic cleaning with the same hydrofluoroether as that used as the solvent for the oil-repellent treatment agent for 5 minutes.

In this manner, a monolithic ceramic inductor, in which the flux infiltration preventing films were formed on the surface of the ceramic element assembly and the surfaces of the external electrodes, was obtained (refer to FIG. 1). In this regard, the flux infiltration preventing films and the Ni and Sn plating films are not shown in FIG. 1, as described above.

Regarding the resulting monolithic ceramic inductor, the self alignment property was examined and, in addition, for the purpose of comparison, the self alignment property of the monolithic ceramic inductor produced without performing the above-described cleaning was also examined.

As a result, it was ascertained that a still better self alignment property was obtained as compared with the case where the cleaning was not performed.

Meanwhile, as for the cleaning solution, in the case where isopropyl alcohol or water was used as the cleaning solution in place of hydrofluoroether, in either case, an improvement in the self alignment property comparable to that in the case where hydrofluoroether was used as the cleaning solution was not observed.

Furthermore, a monolithic ceramic inductor (a sample in which variations are present in flux infiltration preventing films) was produced, where the above-described liquid removal step was omitted so that an excess oil-repellent treatment agent was forced to remain. The resulting sample was washed by using hydrofluoroether, isopropyl alcohol, or water as the washing solution, and the self alignment property of each sample was examined. As a result, in the case where hydrofluoroether was used as the washing solution, it was ascertained that a good self alignment property was obtained. However, in the case where isopropyl alcohol or water was used as the washing solution, it was ascertained that a good self alignment property was not obtained.

From these results, it was ascertained that an excess oil-repellent treatment agent was removed from the monolithic ceramic inductor efficiently and a good self alignment property was able to be ensured by using hydrofluoroether which is the same as the solvent for the oil-repellent treatment agent.

In this regard, a good self alignment property can be realized by any one of the liquid removal of the oil-repellent treatment agent and the washing with hydrofluoroether. However, more uniform flux infiltration preventing films are formed and a stable good self alignment property can be obtained further reliably by combining the two.

In yet another exemplary embodiment, Example 6, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes. The external electrode main bodies (substrate layers) were formed by baking the electrode material paste at 800° C. for 15 minutes.

Next, an oil-repellent treatment was performed by a method described below.

An oil-repellent treatment agent containing a compound represented by A-CF$_2$O(CF$_2$O)x(C$_2$F$_4$O)yCF$_2$-A, where A: —CONH(CH$_2$)$_3$Si(OCH$_3$)$_3$, x, y: 8 to 12, and hydrofluoroether serving as a solvent was prepared.

Then, the oil-repellent treatment agent was put into a container, and the ceramic element assembly (monolithic ceramic inductor) in which the external electrode main bodies were formed by baking the electrode material paste and plating films were further formed, as described above, was dipped therein for about 5 minutes.

Immediately after the dipping was finished, aspiration liquid removal was performed by the same method as the method in Example 4 described above and under the same condition, so that excess oil-repellent treatment solution on the ceramic element assembly was removed.

The ceramic element assembly, from which an excess oil-repellent treatment solution was removed, was heat-treated at 80° C. for about 30 minutes.

Then, the ceramic element assembly was subjected to ultrasonic cleaning with the same hydrofluoroether as that used as the solvent for the oil-repellent treatment agent for 5 minutes.

After the ultrasonic cleaning was finished, aspiration liquid removal was performed by the same method as the method in Example 4 described above and under the same condition, so that hydrofluoroether serving as the washing solution was removed.

Subsequently, two-layer structure plating films composed of a Ni plating film serving as a lower layer and a Sn plating film (or a solder plating film) serving as an upper layer were formed on the external electrode main bodies (substrate layers), so that a monolithic ceramic inductor (refer to FIG. 1) was obtained.

In Example 6, the oil-repellent state of the surface of the monolithic ceramic inductor (ceramic element assembly) was adjusted by adjusting the concentration of the oil-repellent treatment agent, the liquid removal condition, the ultrasonic cleaning condition, and the like and, thereby, monolithic ceramic inductors of Sample Nos. 1, 2, and 3 containing F, Si, and N in the surface of the ceramic element assembly (ferrite element assembly) at ratios shown in Table 3 were produced.

Regarding the surface of the resulting monolithic ceramic inductor, qualitative and quantitative analysis was performed on the basis of XPS (X-ray photoelectron spectroscopy) by using Quantum 2000 produced by PHYSICAL ELECTRONICS INC. The measurement area was specified to be 100 μmϕ.

Table 3 shows the evaluation results of the oil-repellent state of the surface, the self alignment property, and the continuity of Ni plating film, which were examined with respect to the monolithic ceramic inductor of Example 6.

TABLE 3

| Sample No. | Atomic concentration ratio relative to ceramic element assembly (ferrite element assembly) surface | Self alignment propert | Continuity of Ni plating |
|---|---|---|---|
| 1 | (F/ceramic element assembly) = 12<br>(Si/ceramic element assembly) = 1.0<br>(N/ceramic element assembly) = 1.3 | ⊙ | ⊙ |
| 2 | (F/ceramic element assembly) = 8<br>(Si/ceramic element assembly) = 0.6<br>(N/ceramic element assembly) = 0.8 | ⊙ | ⊙ |
| 3 | (F/ceramic element assembly) = 2<br>(Si/ceramic element assembly) = 0.1<br>(N/ceramic element assembly) = 0.1 | ⊙ | ⊙ |

As shown in Table 3:

(a) Regarding the sample of Sample No. 1, the atomic concentration ratios of F, Si, and N relative to the ceramic element assembly (ferrite element assembly) surface on the basis of X-ray photoelectron spectroscopy (XPS) were (F/ceramic element assembly)=12, (Si/ceramic element assembly)=1.0, and (N/ceramic element assembly)=1.3; and (b) regarding the sample of Sample No. 2, the atomic concentration ratios of F, Si, and N relative to the ceramic element assembly (ferrite element assembly) surface on the basis of X-ray photoelectron spectroscopy (XPS) were (F/ceramic element assembly)=8, (Si/ceramic element assembly)=0.6, and (N/ceramic element assembly)=0.8; and (c) regarding the sample of Sample No. 3, the atomic concentration ratios of F, Si, and N relative to the ceramic element assembly (ferrite element assembly) surface on the basis of X-ray photoelectron spectroscopy (XPS) were (F/ceramic element assembly)=2, (Si/ceramic element assembly)=0.1, and (N/ceramic element assembly)=0.1.

In this regard, the "ceramic element assembly" in each of the above-described formulae refers to the total atomic concentration: unit percent by atom of elements (Ni, Cu, Zn, Fe, and the like) detected from the ceramic element assembly, where component elements of the oil-repellent treatment agent and an oxygen element are excluded.

That is, the above-described atomic concentration ratios of F, Si, and N relative to the ceramic element assembly surface are not the ratios of F, Si, and N relative to the atomic concentration of each of Ni, Cu, Zn, Fe, and the like detected from the surface of the ceramic element assembly, but the ratios relative to the total atomic concentration of the elements detected from the surface of the ceramic element assembly, where component elements of the oil-repellent treatment agent and an oxygen element are excluded.

Regarding Sample Nos. 1 to 3 described above, good self alignment property and Ni plating continuity were obtained.

That is, it was ascertained that when the atomic concentration ratios of the individual elements of F, Si, and N relative to the ceramic element assembly (ferrite element assembly) surface satisfy the requirements:

$2 \leq$ (F/ceramic element assembly) $\leq 12$, $0.1 \leq$ (Si/ceramic element assembly) $\leq 1.0$, and $0.1 \leq$ (N/ceramic element assembly) $\leq 1.3$, good self alignment property and Ni plating continuity were obtained.

In yet another embodiment, Example 7, an electrode material paste for forming an external electrode was applied by a dipping method to the end surfaces, at which the lead electrodes were exposed, of the same fired body as the ceramic element assembly (fired body) produced in Example 1 described above, and drying was performed at 120° C. for 10 minutes. The external electrode main bodies (substrate layers) were formed by baking the electrode material paste at 800° C. for 15 minutes.

Subsequently, two-layer structure plating films composed of a Ni plating film serving as a lower layer and a Sn plating film (or a solder plating film) serving as an upper layer were formed on the external electrode main bodies (substrate layers).

Next, an oil-repellent treatment was performed by a method described below.

An oil-repellent treatment agent containing a compound represented by A-$CF_2O(CF_2O)x(C_2F_4O)yCF_2$-A, where A: —$CONH(CH_2)_3Si(OCH_3)_3$, x, y: 8 to 12, and hydrofluoroether serving as a solvent was prepared.

Then, the oil-repellent treatment agent was put into a container, and the ceramic element assembly (monolithic ceramic inductor) in which the external electrode main bodies were formed by baking the electrode material paste and plating films were further formed, as described above, was dipped therein for about 5 minutes.

Immediately after the dipping was finished, aspiration liquid removal was performed by the same method as the method in Example 4 described above and under the same condition, so that excess oil-repellent treatment solution on the ceramic element assembly was removed.

The ceramic element assembly, from which an excess oil-repellent treatment solution was removed, was heat-treated at 80° C. for about 30 minutes.

Then, the ceramic element assembly was subjected to ultrasonic cleaning with the same hydrofluoroether as that used as the solvent for the oil-repellent treatment agent for 5 minutes.

After the ultrasonic cleaning was finished, aspiration liquid removal was performed by the same method as the method in Example 4 described above and under the same condition, so that hydrofluoroether serving as the washing solution was removed and a monolithic ceramic inductor (refer to FIG. 1) was obtained.

In Example 7 as well, the oil-repellent state of the surface of the monolithic ceramic inductor was adjusted by adjusting the concentration of the oil-repellent treatment agent, the liquid removal condition, the ultrasonic cleaning condition, and the like and, thereby, monolithic ceramic inductors of Sample Nos. 4, 5, and 6 containing F, Si, and N in the surface of the ceramic element assembly and the surface of the external electrode at ratios shown in Table 4 were produced.

Regarding the surface of the resulting monolithic ceramic inductor, qualitative and quantitative analysis was performed on the basis of XPS (X-ray photoelectron spectroscopy) by using Quantum 2000 produced by PHYSICAL ELECTRONICS INC. The measurement area was specified to be 100 μmφ.

Table 4 shows the evaluation results of the oil-repellent state of the surface, the self alignment property, and the continuity of Ni plating film, which were examined with respect to the monolithic ceramic inductor of Example 7.

TABLE 4

| Sample No. | Atomic concentration ratio relative to ceramic element assembly (ferrite element assembly) surface | Atomic concentration ratio relative to external electrode (uppermost plating film) surface | Self alignment property | Continuity of Ni plating |
|---|---|---|---|---|
| 4 | (F/ceramic element assembly) = 12 (Si/ceramic element assembly) = 1.0 (N/ceramic element assembly) = 1.3 | (F/external electrode) = 10 (Si/external electrode) = 0.8 (N/external electrode) = 1.0 | ⊙ | ⊙ |
| 5 | (F/ceramic element assembly) = 8 (Si/ceramic element assembly) = 0.6 (N/ceramic element assembly) = 0.8 | (F/external electrode) = 4 (Si/external electrode) = 0.4 (N/external electrode) = 0.6 | ⊙ | ⊙ |
| 6 | (F/ceramic element assembly) = 2 (Si/ceramic element assembly) = 0.1 (N/ceramic element assembly) = 0.1 | (F/external electrode) = 0.4 (Si/external electrode) = 0.06 (N/external electrode) = 0.07 | ⊙ | ⊙ |

As shown in Table 4:

(a) Regarding the sample of Sample No. 4, the atomic concentration ratios of F, Si, and N relative to the ceramic element assembly (ferrite element assembly) surface on the basis of X-ray photoelectron spectroscopy (XPS) were (F/ceramic element assembly)=12, (Si/ceramic element assembly)=1.0, and (N/ceramic element assembly)=1.3;

(b) regarding the sample of Sample No. 5, the atomic concentration ratios of F, Si, and N relative to the ceramic element assembly (ferrite element assembly) surface on the basis of X-ray photoelectron spectroscopy (XPS) were (F/ceramic element assembly)=8, (Si/ceramic element assembly)=0.6, and (N/ceramic element assembly)=0.8; and (c) regarding the sample of Sample No. 6, the atomic concentration ratios of F, Si, and N relative to the ceramic element assembly (ferrite element assembly) surface on the basis of X-ray photoelectron spectroscopy (XPS) were (F/ceramic element assembly)=2, (Si/ceramic element assembly)=0.1, and (N/ceramic element assembly)=0.1.

As shown in Table 4:

(d) Regarding the sample of Sample No. 4, the atomic concentration ratios of F, Si, and N relative to the external electrode (uppermost plating film) surface on the basis of X-ray photoelectron spectroscopy (XPS) were (F/external electrode)=10, (Si/external electrode)=0.8, and (N/external electrode)=1.0;

(e) regarding the sample of Sample No. 5, the atomic concentration ratios of F, Si, and N relative to the external electrode (uppermost plating film) surface on the basis of X-ray photoelectron spectroscopy (XPS) were (F/external electrode)=4.0, (Si/external electrode)=0.4, and (N/external electrode)=0.6; and (f) regarding the sample of Sample No. 6, the atomic concentration ratios of F, Si, and N relative to the external electrode (uppermost plating film) surface on the basis of X-ray photoelectron spectroscopy (XPS) were (F/external electrode)=0.4, (Si/external electrode)=0.06, and (N/external electrode)=0.07.

In this regard, the "ceramic element assembly" in each of the above-described formulae refers to the total atomic concentration: unit percent by atom of elements (Ni, Cu, Zn, Fe, and the like) detected from the ceramic element assembly, where component elements of the oil-repellent treatment agent and an oxygen element are excluded.

That is, the above-described atomic concentration ratios of F, Si, and N relative to the ceramic element assembly surface are not the ratios of F, Si, and N relative to the atomic concentration of each of Ni, Cu, Zn, Fe, and the like detected from the surface of the ceramic element assembly, but the ratios relative to the total atomic concentration of the elements detected from the surface of the ceramic element assembly, where component elements of the oil-repellent treatment agent and an oxygen element are excluded.

Meanwhile, the "external electrode" in each of the above-described formulae refers to the total atomic concentration: unit percent by atom of elements (Ni, Ag, Zn, and the like) detected from the external electrode, where component elements of the oil-repellent treatment agent and an oxygen element are excluded.

That is, the above-described atomic concentration ratios of F, Si, and N relative to the external electrode surface are not the ratios of F, Si, and N relative to the atomic concentration of each of Ni, Ag, Zn, and the like detected from the surface of the external electrode, but the ratios relative to the total atomic concentration of the elements detected from the surface of the external electrode, where component elements of the oil-repellent treatment agent and an oxygen element are excluded.

Regarding Sample Nos. 4 to 6 described above, it was ascertained that good self alignment property and Ni plating continuity were obtained.

That is, it was ascertained that when the atomic concentration ratios of the individual elements of F, Si, and N relative to the ceramic element assembly (ferrite element assembly) surface (Fe, Zn, Ni, Cu) satisfy the requirements:

$2 \leq $ (F/ceramic element assembly) $\leq 12$, $0.1 \leq $ (Si/ceramic element assembly) $\leq 1.0$, and $0.1 \leq $ (N/ceramic element assembly) $\leq 1.3$, and, in addition, the atomic concentration ratios of the individual elements of F, Si, and N relative to the external electrode (uppermost plating film) surface satisfy the requirements:

0.4≦(F/external electrode)≦10, 0.06≦(Si/external electrode)≦0.8, and 0.07≦(N/external electrode)≦10, good self alignment property and Ni plating continuity were obtained.

In embodiments of the present disclosure, in production of the ceramic electronic component provided with the ceramic element assembly and the external electrodes provided on the surface of the ceramic element assembly, the external electrodes are formed on the surface of the ceramic element assembly and, thereafter, the ceramic element assembly is subjected to the oil-repellent treatment through the use of the oil-repellent treatment agent containing the polyfluoropolyether compound, which includes at least one —CONH (CH$_2$)$_3$Si(OR)$_3$ (where OR represents a methoxy group or an ethoxy group), as a primary component and hydrofluoroether as a solvent, so as to form a flux infiltration preventing film on the surface of the ceramic element assembly. Consequently, absorption of the flux into the ceramic element assembly can be prevented and good mountability (self alignment property) can be realized. Furthermore, the flux infiltration preventing film is thin and, therefore, the conduction between the external electrode and the land electrode, on which mounting is performed, of the circuit board and the like and the solderability of the external electrode are ensured.

That is, according to embodiments of the disclosure, the flux infiltration preventing film having a small thickness (several tens of nanometers or less) can be formed reliably, and good mountability (self alignment property) can be realized without sacrificing the conduction, the solderability, and the like.

In embodiments of the disclosure, hydrofluoroether is used as a solvent of the oil-repellent treatment agent. This hydrofluoroether serving as the solvent of the oil-repellent treatment agent has a very small water solubility, so that it is possible to suppress condensation through hydrolysis of —CONH (CH$_2$)$_3$Si(OR)$_3$ serving as a functional group of a primary component of the oil-repellent treatment agent and prevent gelation.

Likewise, in production of the ceramic electronic component provided with the ceramic element assembly and the external electrodes having the plating films on the surfaces, in the case where the plating films are formed on the surfaces of the external electrodes and, thereafter, the ceramic element assembly is subjected to the oil-repellent treatment through the use of the oil-repellent treatment agent containing the polyfluoropolyether compound, which includes at least one —CONH(CH$_2$)$_3$Si(OR)$_3$ (where OR represents a methoxy group or an ethoxy group), as a primary component and hydrofluoroether as a solvent, so as to form a flux infiltration preventing film on the surface of the ceramic element assembly, it is possible to prevent absorption of the flux into the ceramic element assembly, reliably form the flux infiltration preventing film having a small thickness on the surface of the ceramic element assembly provided with the external electrodes having the plating films, and realize good mountability (self alignment property) without sacrificing the conduction, the solderability, and the like.

Moreover, it is also expected that the flux infiltration preventing film exerts an effect of preventing oxidation of the plating film on the external electrode.

In production of the ceramic electronic component provided with a ceramic element assembly and external electrodes having plating films on the surfaces, in the case where the ceramic element assembly is subjected to the oil-repellent treatment, after formation of the external electrodes and before formation of the plating films, through the use of the oil-repellent treatment agent containing the polyfluoropolyether compound, which includes at least one —CONH (CH$_2$)$_3$Si(OR)$_3$ (where OR represents a methoxy group or an ethoxy group), as a primary component and hydrofluoroether as a solvent, so as to form the flux infiltration preventing film on the surface of the ceramic element assembly, absorption of the flux into the ceramic element assembly can be prevented and good mountability (self alignment property) can be realized. Furthermore, the flux infiltration preventing film is thin and, therefore, the plating performance in the plating step after the flux infiltration preventing film is formed and the solderability and the reliability in conduction in mounting of the product are ensured.

In the case where the compound specified is used as the polyfluoropolyether compound is as follows:

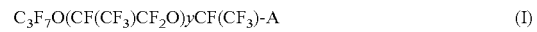 (I)

 (II)

 (III)

 (IV)

 (V)

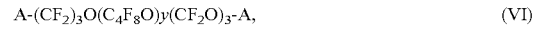 (VI)

where A represents at least one type selected from the group consisting of

 (a)

in which OR represents a methoxy group or an ethoxy group,

 (b)

 (c)

 (d)

 (e)

and in the structural formulae in the items (I) to (VI), at least one of A is —CONH(CH$_2$)$_3$Si(OR)$_3$ in the item (a), x represents 1 to 50, y represents 4 to 40, and n represents 1 to 4, which is a primary component of the oil-repellent treatment agent, a desired flux infiltration preventing film can be formed on the surface of the ceramic element assembly reliably, so that the present invention can be made more effective.

In the case where the oil-repellent treatment is performed by using the oil-repellent treatment agent having a polyfluoropolyether compound concentration of 0.04 to 0.5 percent by weight, the flux infiltration preventing film exhibiting good workability and having a thickness which can prevent infiltration of the flux and which is not excessively large can be formed on the surface of the ceramic element assembly reliably, so that the present invention can be made more effective.

In the case where the oil-repellent treatment agent removal step to remove an excess oil-repellent treatment agent is performed immediately after the oil-repellent treatment step, the flux infiltration preventing film exhibiting no variations in coating and having a uniform thickness can be formed reliably.

Liquid removal of excess oil-repellent treatment agent can be performed by methods of, for example, contact with a gas stream, e.g., aspiration or gas blowing, and centrifugal separation. However, the method for removing excess oil-repellent treatment agent is not limited to them.

In the case where the washing step to wash the ceramic element assembly with hydrofluoroether is performed after the oil-repellent treatment agent removal step, an unnecessary oil-repellent treatment agent can be removed more reliably. Even when there are variations in the application state of the oil-repellent treatment agent, it is possible to remove an excess oil-repellent treatment agent and form the flux infiltration preventing film having a uniform thickness, so that useful functions are performed.

In the case where the step to heat-treat the ceramic element assembly is performed between the oil-repellent treatment agent removal step and the washing step, the flux infiltration preventing film can be fixed to the surface of the ceramic element assembly more reliably, so that the present invention can be made more effective. It is desirable that the heat treatment is performed usually at 60° C. to 120° C. for about 30 min.

In the case where NiCuZn ferrite is used as the ceramic constituting the ceramic element assembly, an inductor exhibiting excellent mountability and high reliability can be obtained.

In an embodiment of a ceramic electronic component comprising a ceramic element assembly and external electrodes provided on the surface of the ceramic element assembly, where at least F, Si, and N are detected from the surface of the ceramic constituting the ceramic element assembly, and the atomic concentration ratios of the individual elements relative to the ceramic surface satisfy the requirements: $2 \leq$ (F/ceramic element assembly) $\leq 12$, $0.1 \leq$ (Si/ceramic element assembly) $\leq 1.0$, and $0.1 \leq$ (N/ceramic element assembly) $\leq 1.3$, the ceramic electronic component can be produced efficiently by the above-described method for manufacturing a ceramic electronic component.

Regarding this ceramic electronic component, the flux is not absorbed into the ceramic element assembly in the soldering step and, therefore, a good self alignment property is obtained.

In a ceramic electronic component including a ceramic element assembly and external electrodes provided on the surface of the ceramic element assembly, and at least F, Si, and N are detected from the surface of the ceramic constituting the ceramic element assembly and the surface of the external electrode, where the atomic concentration ratios of the individual elements of F, Si, and N at the surface of the ceramic relative to the ceramic surface satisfy the requirements: $2 \leq$ (F/ceramic element assembly) $\leq 12$, $0.1 \leq$ (Si/ceramic element assembly) $\leq 1.0$, and $0.1 \leq$ (N/ceramic element assembly) $\leq 1.3$ and the atomic concentration ratios of the individual elements of F, Si, and N at the surface of the external electrode to the external electrode surface satisfy the requirements: $0.4 \leq$ (F/external electrode) $\leq 10$, $0.06 \leq$ (Si/external electrode) $\leq 0.8$, and $0.07 \leq$ (N/external electrode) $\leq 1.0$, the ceramic electronic component can be produced efficiently by the above-described method for manufacturing a ceramic electronic component.

Regarding this ceramic electronic component, the flux is not absorbed into the ceramic element assembly in the soldering step and, therefore, a good self alignment property is obtained.

Regarding this ceramic electronic component, the thickness of coating film (flux infiltration preventing film) of the external electrode is small (usually several tens of nanometers or less) and, therefore, sufficient reliability in conduction can be ensured.

In each of the above-described examples, the monolithic ceramic inductor was explained as an example of the ceramic electronic component. However, embodiments are not limited to the monolithic ceramic inductor, and it is possible to widely apply to various ceramic electronic components, e.g., monolithic ceramic capacitors and ceramic piezoelectric components, having a structure in which an external electrode is provided on the surface of a ceramic element assembly.

Furthermore, the present disclosure is not limited to the above-described examples in other points. For example, various applications and modifications can be made regarding the type of the polyfluoropolyether compound serving as a primary component of the oil-repellent treatment agent, the blend ratio relative to the solvent, and the like. The scope of the invention should be determined in view of the appended claims and their equivalents.

What is claimed is:

1. A method for manufacturing a ceramic electronic component provided with a ceramic element assembly and external electrodes provided on the surface of the ceramic element assembly, comprising:

performing an oil-repellent treatment by forming the external electrodes on the surface of the ceramic element assembly and subjecting the ceramic element assembly to an oil-repellent treatment through the use of an oil-repellent treatment agent to form a flux infiltration preventing film on the surface of the ceramic element assembly, wherein the oil-repellent treatment agent contains a polyfluoropolyether compound, as a primary component and hydrofluoroether as a solvent, wherein the polyfluoropolyether compound in the oil-repellent treatment agent is at least one type selected from the group consisting of the compounds described in the following items (I), and (II):

$$C_3F_7O(CF(CF_3)CF_2O)yCF(CF_3)\text{-A, and} \qquad (I)$$

$$CF_3O(C_2F_4O)yCF_2\text{-A,} \qquad (II)$$

where A represents $-CONH(CH_2)_3Si(OR)_3$, in which OR represents a methoxy group or an ethoxy group, and in the structural formulae in the items (I) and (II), y represents 4 to 40.

2. The method for manufacturing a ceramic electronic component according to claim 1, wherein the oil-repellent treatment is performed by using the oil-repellent treatment agent having a polyfluoropolyether compound concentration of 0.04 to 0.5 percent by weight.

3. The method for manufacturing a ceramic electronic component according to claim 1, the method characterized by comprising an oil-repellent treatment agent removal step to remove an excess oil-repellent treatment agent immediately after the oil-repellent treatment step.

4. The method for manufacturing a ceramic electronic component according to claim 3, the method characterized by comprising a washing step to wash the ceramic element assembly with hydrofluoroether after the oil-repellent treatment agent removal step.

5. The method for manufacturing a ceramic electronic component according to claim 4, the method characterized by comprising a step to heat-treat the ceramic element assembly between the oil-repellent treatment agent removal step and the washing step.

6. The method for manufacturing a ceramic electronic component according to claim 1, the method characterized in that the ceramic constituting the ceramic element assembly is NiCuZn ferrite.

7. A method for manufacturing a ceramic electronic component provided with a ceramic element assembly and external electrodes, which are provided on the surface of the ceramic element assembly and which have plating films on the surfaces, comprising:

performing an oil-repellent treatment by forming the plating films on the surfaces of the external electrodes and subjecting the ceramic element assembly to an oil-repellent treatment through the use of an oil-repellent treatment agent, so as to form a flux infiltration preventing film on the surface of the ceramic element assembly, wherein the oil-repellent treatment agent contains a polyfluoropolyether compound, as a primary component and hydrofluoroether as a solvent, wherein the polyfluoropolyether compound in the oil-repellent treatment agent is at least one type selected from the group consisting of the compounds described in the following items (I) and (II):

$$C_3F_7O(CF(CF_3)CF_2O)yCF(CF_3)\text{-A, and} \quad (I)$$

$$CF_3O(C_2F_4O)yCF_2\text{-A,} \quad (II)$$

where A represents —$CONH(CH_2)_3Si(OR)_3$, in which OR represents a methoxy group or an ethoxy group, and in the structural formulae in the items (I) and (II), y represents 4 to 40.

8. The method for manufacturing a ceramic electronic component according to claim 7, wherein the oil-repellent treatment is performed by using the oil-repellent treatment agent having a polyfluoropolyether compound concentration of 0.04 to 0.5 percent by weight.

9. The method for manufacturing a ceramic electronic component according to claim 7, the method characterized by comprising an oil-repellent treatment agent removal step to remove an excess oil-repellent treatment agent immediately after the oil-repellent treatment step.

10. The method for manufacturing a ceramic electronic component according to claim 9, the method characterized by comprising a washing step to wash the ceramic element assembly with hydrofluoroether after the oil-repellent treatment agent removal step.

11. The method for manufacturing a ceramic electronic component according to claim 10, the method characterized by comprising a step to heat-treat the ceramic element assembly between the oil-repellent treatment agent removal step and the washing step.

12. The method for manufacturing a ceramic electronic component according to claim 7, the method characterized in that the ceramic constituting the ceramic element assembly is NiCuZn ferrite.

13. A method for manufacturing a ceramic electronic component provided with a ceramic element assembly and external electrodes, which are provided on the surface of the ceramic element assembly and which have plating films on the surfaces, comprising:

performing an oil-repellent treatment by subjecting the ceramic element assembly to an oil-repellent treatment, after formation of the external electrodes and before formation of the plating films, through the use of an oil-repellent treatment agent, so as to form a flux infiltration preventing film on the surface of the ceramic element assembly, wherein the oil-repellent treatment agent contains a polyfluoropolyether compound, as a primary component and hydrofluoroether as a solvent, wherein the polyfluoropolyether compound in the oil-repellent treatment agent is at least one type selected from the group consisting of the compounds described in the following items (I) and (II):

$$C_3F_7O(CF(CF_3)CF_2O)yCF(CF_3)\text{-A, and} \quad (I)$$

$$CF_3O(C_2F_4O)yCF_2\text{-A,} \quad (II)$$

in which A represents —$CONH(CH_2)_3Si(OR)_3$, in which OR represents a methoxy group or an ethoxy group, and in the structural formulae in the items (I) and (II), y represents 4 to 40.

14. The method for manufacturing a ceramic electronic component according to claim 13, wherein the oil-repellent treatment is performed by using the oil-repellent treatment agent having a polyfluoropolyether compound concentration of 0.04 to 0.5 percent by weight.

15. The method for manufacturing a ceramic electronic component according to claim 13, the method characterized by comprising an oil-repellent treatment agent removal step to remove an excess oil-repellent treatment agent immediately after the oil-repellent treatment step.

16. The method for manufacturing a ceramic electronic component according to claim 15, the method characterized by comprising a washing step to wash the ceramic element assembly with hydrofluoroether after the oil-repellent treatment agent removal step.

17. The method for manufacturing a ceramic electronic component according to claim 16, the method characterized by comprising a step to heat-treat the ceramic element assembly between the oil-repellent treatment agent removal step and the washing step.

18. The method for manufacturing a ceramic electronic component according to claim 13, the method characterized in that the ceramic constituting the ceramic element assembly is NiCuZn ferrite.

* * * * *